US007456391B2

(12) United States Patent
Zare et al.

(10) Patent No.: US 7,456,391 B2
(45) Date of Patent: Nov. 25, 2008

(54) GATING DEVICE AND DRIVER FOR MODULATION OF CHARGED PARTICLE BEAMS

(75) Inventors: Richard N. Zare, Stanford, CA (US); Facundo M. Fernandez, Atlanta, GA (US); Joel R. Kimmel, Menlo Park, CA (US); Oliver Trapp, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/411,393

(22) Filed: Apr. 25, 2006

(65) Prior Publication Data

US 2006/0192105 A1 Aug. 31, 2006

Related U.S. Application Data

(62) Division of application No. 10/683,244, filed on Oct. 9, 2003, now Pat. No. 7,067,803.

(60) Provisional application No. 60/417,883, filed on Oct. 11, 2002.

(51) Int. Cl.
*B01D 59/44* (2006.01)

(52) U.S. Cl. ........................ 250/287; 250/282; 250/281

(58) Field of Classification Search .......... 250/281-300
See application file for complete search history.

(56) References Cited

U.S. PATENT DOCUMENTS

| | | | | |
|---|---|---|---|---|
| 5,032,722 | A | 7/1991 | Boesl et al. | |
| 5,981,946 | A * | 11/1999 | Mason | 250/287 |
| 5,986,258 | A | 11/1999 | Park | |
| 6,198,096 | B1 * | 3/2001 | Le Cocq | 250/287 |
| 6,300,626 | B1 * | 10/2001 | Brock et al. | 250/287 |
| 6,661,001 | B2 | 12/2003 | Park | |
| 6,664,545 | B2 | 12/2003 | Kimmel et al. | |
| 6,781,120 | B2 | 8/2004 | LeCursi et al. | |
| 6,782,342 | B2 * | 8/2004 | LeGore et al. | 702/181 |
| 2004/0231150 | A1 | 11/2004 | Charles, Jr. et al. | |

OTHER PUBLICATIONS

Bradbury et al., "Absolute Values of the Electron Mobility in Hydrogen", Physical Review, vol. 49, Mar. 1, 1936 pp. 388-393.

Brock et al., "Characterization of a Hadamard Transform Time-of-Flight Mass Spectrometer," Review of Scientific Instruments, vol. 71, No. 3, Mar. 2000, pp. 1306-1318.

Kimmel et al., "Effects of Modulation Defects of Hadamard Transform Time-of-Flight Mass Spectrometry (HT-TOFMS)," American Society for Mass Spectrometry, 2003, pp. 278-286.

Kimmel et al., "Novel Method for the Production of Finely Spaced Bradbury-Nielson Gates," Review of Scientific Instruments, vol. 72, No. 12, Dec. 2001, pp. 4354-4357.

Piyadasa et al., "A High Resolving Power Ion Selector for Post-source Decay Measurements in a Reflecting Time-of-flight Mass Spectrometer", Rapid Commun. Mass Spectrom. 1998,12, 1655-1664.

(Continued)

*Primary Examiner*—Jack I. Berman
*Assistant Examiner*—Andrew Smyth
(74) *Attorney, Agent, or Firm*—Davis Wright Tremaine LLP

(57) ABSTRACT

By connecting the Bradbury-Nielson gate (BNG) directly to a driver without a transmission line, distortion of the voltage waveform experienced a the BNG are much reduced. Because the magnitude of the modulation defects grows as the applied modulation voltage is increased, Bradbury-Nielson gates with finer wire spacing such as 100 microns, and operating at 10 to 15 V, significantly better signal-to-noise ratios are achieved. HT-TOFMS data were also post processed using an exact knowledge of the modulation defects.

5 Claims, 11 Drawing Sheets

OTHER PUBLICATIONS

Vlasak et al., "An interleaved comb ion deflection gate for *m/z* selection in time-of-flight mass spectrometry", Rev. Sci. Instrum. 67(1), Jan. 1996.

Yefchak et al., "Beam Deflection for Temporal Encoding in Time-of-Flight Mass Spectrometry", J Am Soc Mass Spectrum 1990, 1, 440-447.

* cited by examiner

GATING DEVICE AND DRIVER FOR MODULATION OF CHARGED PARTICLE BEAMS

CROSS REFERENCE TO RELATED APPLICATIONS

This application is a divisional of application Ser. No. 10/683,244, filed Oct. 9, 2003 now U.S. Pat. No. 7,067,803; which application claims the benefit of U.S. Provisional Patent Application No. 60/417,883, filed Oct. 11, 2002. These applications are incorporated by reference as if fully set forth herein.

FIELD OF THE INVENTION

The invention relates to a gating device for analyzing a stream of charged particles, such as ions. In particular, the invention relates to a system of such a gating device and a driver that can be used for rapid and accurate modulation of ion beams.

BACKGROUND OF THE INVENTION

One of the most convenient methods for deflecting the trajectory of a beam of charged particles is to use an interleaved comb of wires which form one type of a Bradbury-Nielson gate (BNG). As described in this application, such BNG may comprise two electrically isolated sets of equally spaced wires that lie in the same plane and alternate in potential. FIG. 1A summarizes the operation of this BNG. When no potential is applied to the wires relative to the acceleration energy of the charged particles, the trajectory of the charged particle beam is undeflected by the gate. To deflect the beam, bias potentials of equal magnitude and opposite polarity are applied to the two individual wire sets. Deflection produces two separate beam profiles, each of whose intensity maximum makes an angle a with respect to the path of the undeflected beam. In this manner it is possible to modulate or gate ion beams in a controlled fashion.

An extremely demanding application for these gates is Hadamard Transform Time-of-flight Mass Spectrometry (HT-TOFMS). In HT-TOFMS the ion beam is modulated with a pseudorandom sequence of on and off pulses by applying the corresponding modulation to a Bradbury-Nielson gate. Typical modulation rates are on the order of 10 to 20 MHz with modulation voltages of 10-50 V with respect to the voltage of ~1 kV used to accelerate the ions. After the encoding sequence (usually a maximum length pseudorandom sequence) is applied, the ion packets created by the on/off modulation interpenetrate one another as they drift through the flight tube. The detected signal is a convolution of the mass spectra corresponding to these packets. Using knowledge of the applied encoding sequence, this signal is deconvoluted to yield a single mass spectrum. This process is described in more detail in U.S. Pat. No. 6,300,626, which is incorporated by reference herein in its entirety.

The integrity of the deconvolution in HT-TOFMS is dependent on the profile of the applied pulses and the fidelity of the sequence felt by the ions. Ions that are improperly modulated because of spatial and energetic ambiguities at the gate will be observed as noise after deconvolution of the detector signal. If the error in modulation is time-invariant the noise appears as discrete peaks in the mass spectrum, called echoes. The position and the sign of the echoes depend on the nature of the modulation error.

The maximum achievable mass resolution of mass spectrometers that gate ions using a BNG is dependent on the duration of the pulses applied to the gate. Likewise, when using an ion gate for m/z selection, the mass resolution of the gate is dependent on how rapidly the gate can switch the beam on and off. The mass resolution of a Bradbury-Nielson gate is thus dependent on how fast the necessary voltage can be applied to the wires.

FIG. 1 depicts the three primary components of one possible set-up where the electronics associated with the BNG sat outside the instrument. The encoding sequence was generated by a system of shift registers, split into two inverse phases, and used to drive a push-pull amplifier (driver) to form a train of square pulses. In conventional implementations, these pulses traveled through significant lengths of transmission line to reach the BNG, which was housed inside the vacuum chamber of the MS. This complex set-up may be problematic for instrument performance and made repair of the BNG and the associated electronics unnecessarily time consuming.

Prior HT-TOFMS performance was ultimately limited by inaccuracies in the electronic sequence delivered to the BNG. Because of mismatched impedances between the driver and the BNG and the length of the transmission lines being used, such as would be possible in the set-up of FIG. 1, where the BNG driver is connected to the BNG by a transmission line, and the driver is situated outside the vacuum chamber, whereas the BNG is in the chamber. In such event, it is found that the square pulses were plagued by ringing, overshoot, slow settling rates, and mismatched voltages between the two wire sets and the instrument liner. These instabilities led to modulation errors, which in turn caused discrete echoes in the mass spectra and reduced the intensity of real peaks. In addition to decreasing sensitivity, echoes complicate the interpretation of mass spectra and reduce mass resolution by broadening real peaks, as echoes are common in the bins adjacent to real peaks. Because of the severe skewing, the frequency at which the modulation sequence was applied, and hence the maximum achievable resolution, was limited. It is, therefore, desirable to provide an improved system where the above described problems are alleviated or avoided. A detailed description of the problems encountered with the conventional design of a HT-TOFMS system is described in more detail on pages 278-280 of Effects of Modulation Defects on Hadamard Transform Time-of-flight Mass Spectrometry (HT-TOFMS), Kimmel, J. R.; Fernandez, F. M., Zare, R. N., 2003 American Society for Mass Spectrometry.

SUMMARY OF THE INVENTION

One aspect of this invention is based on the recognition that, by placing both the gating device for controlling the stream of charged particles and the driver for driving the gating device on the same substrate, the above described problems can be avoided. By placing both the gating device and the driver on the same substrate, the transmission line other wise necessary to connect them can be eliminated or much reduced in length, so that the above described problems are reduced or avoided.

Another aspect of this invention is based on the recognition that, by reducing the spacing between conductors in the gating device, the applied modulation voltage can also be reduced, resulting in an increased signal-to-noise ratios that were more than two times higher than those achieved with more widely spaced gates. In one embodiment, the gate comprises an array of conductors at a spacing of not more than about 300 microns between adjacent conductors; and the driver applies electrical potentials with respect to a reference potential of magnitude not more than about 30 volts to the conductors to control passage of a stream of charged particles through the gate to enable analysis of the particles.

While the above described aspects of the invention are useful for HT-TOFMS, they have potential application in any instrument where a beam of ions needs to be shuttered on and off with high temporal and spatial resolution. Such applications include, for example, ion gating in ion mobility spectrometry (IMS) and MS, mass filtering in IMS and MS, pulsed ion guns for surface analysis such as in Secondary Ion Mass Spectrometry, controlled ion surface reaction, and mass selection in tandem MS.

Yet another aspect of this invention is based on the recognition that the results of a Hadamard transform time-of-flight mass spectrometric method for analyzing samples can be improved by providing a defect compensated decoding matrix corresponding to an encoding sequence used in the system to correct for the distortions in the system. This matrix is used to decode a signal obtained by detecting the charged particle beam encoded with the corresponding encoding sequence. In one embodiment, the matrix is provided with the assistance of knowledge of the defects that characterize the HT-TOFMS system, which defects can be discovered.

BRIEF DESCRIPTION OF THE DRAWINGS

FIG. 6A illustrates ringing and other errors that prevent the square pulses from returning to 0V.

FIG. 6B illustrates the results when insufficient voltage is applied to deflect all ions.

FIG. 6C illustrates overshoot as the pulses returns to 0.

FIG. 6D illustrates rise time error as the pulse goes from 0 V to its deflection value.

FIG. 10A is a graphical plot of spectrum deconvoluted using the inverse of an ideal simplex matrix. FIG. 10B is a graphical plot of spectrum deconvoluted with the inverse of a simplex matrix generated to include the defective sequence.

For simplicity and description, identical components are labeled by the same numerals in this application.

DETAILED DESCRIPTION OF THE EMBODIMENTS

Figure 1A:
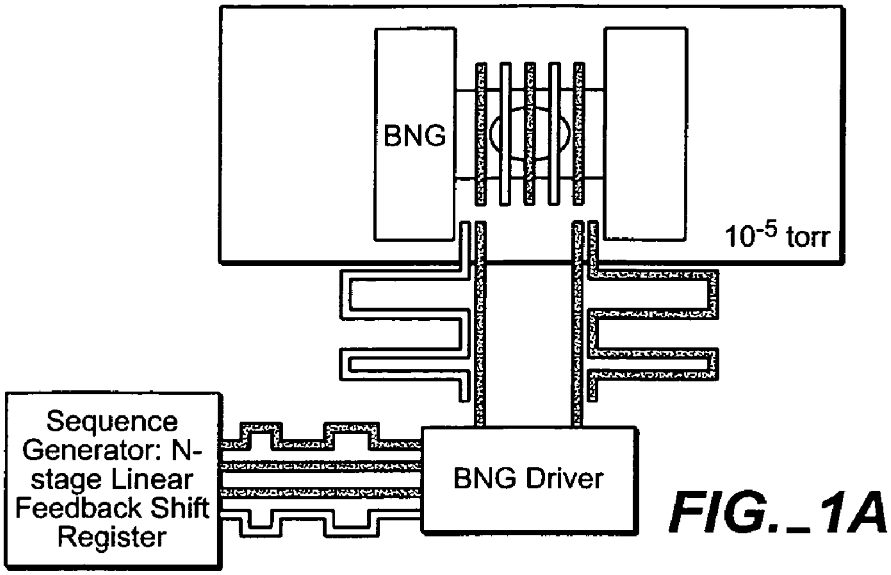
FIG. 1A is a schematic view of the three basic components of the modulation system in a Hadamard Transform Time-of-flight Mass Spectrometer: sequence generator, BNG Driver, and BNG, useful for illustrating the invention. Prior to this invention, the BNG driver was situated outside the vacuum chamber.
Figure 1B:
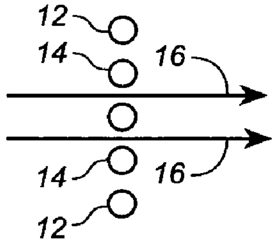
FIG. 1B (PRIOR ART)
FIGS. 1B and 1C are schematic views illustrating operation of a Bradbury-Nielson gate, useful for illustrating the invention.
Figure 1C:
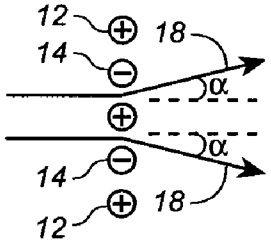
FIG. 1C (PRIOR ART)

Detailed descriptions of how encoding sequences are applied in HT-TOFMS can be found in U.S. Pat. No. 6,300,626, and in Brock, A.; Rodriguez, N.; Zare, R. N. Rev.Sci.Instrumen. 2000, 71, 1306-18., and only a brief review is given here. Ions are accelerated toward a BNG. This ion gate consists of two isolated sets of wires 12 and 14, which are interleaved and lie in the same plane. A pseudorandom sequence of 1's and 0's, reflecting the first row of a simplex matrix, is generated by a system of shift registers, split into two inverse phases, and used to drive a push-pull amplifier to form a train of square pulses. These two amplified phases are simultaneously applied to the two wire sets of the BNG, such as the sets shown in FIGS. 1B and 1C. The wires of the BNG float at the acceleration voltage of the mass spectrometer. A "1" in the sequence holds both wire sets at the same voltage (100% transmission), which is that of the acceleration voltage, as illustrated in FIG. 1B, so that substantially all of the ions pass along path 16 to a detector (not shown). A "0" in the sequence raises one wire set above the acceleration voltage and lowers the other wire set below the acceleration voltage by the same amount, as illustrated in FIG. 1C. Ions incident on the BNG are attracted by one wire set and deflected by the other, causing the ions to diverge from their initial flight path 16 and to another path(s) 18 and miss the detector (0% transmission). The sequence is applied to the BNG at a rate of 10 MHz. The rapid on/off modulation of the ion beam creates ion packets of assorted sizes. These ion packets interpenetrate one another as they drift through the flight tube toward the detector. Typically, more than one thousand packets exist in the flight tube at the same time. The detected signal is a convolution of the time-of-flight spectra corresponding to these different packets.

As described in U.S. Pat. No. 6,870,157, and entitled "Time-of-Flight Mass Spectrometer System" by Richard N. Zare, in a modified HT-TOFMS scheme, it is possible to modulate or gate ion beams so that the beams are deflected by different amounts to distinguish between two different states, when the sequence is a "0" and "1" instead of leaving the beam undeflected when the sequence is a "1", by applying bias potentials of different magnitudes to the two individual wire sets. This application is incorporated by reference herein in its entirety.

Using knowledge of the applied sequence, the signal is deconvoluted to yield the time-of-flight spectrum. The matrix used for deconvolution assumes that the applied pulse shapes are perfectly square and that only two deflection modes exist: 100% transmission and 0% transmission. The fidelity of the deconvolution thus depends on the profile of the applied pulses and the discreteness of the sequence as felt by the ions passing through the BNG. This first factor depends on the accuracy of the RF circuitry used whereas the second factor corresponds to the size and strength of the BNG's effective field.

We have designed a circuit board that integrates the BNG and BNG driver into one unit that mounts within a custom heat-dissipating vacuum chamber. The BNG gate is soldered to the surface of a BNG driver board for use inside of a vacuum chamber. The center hole in the board allows the ion beam to pass; the BNG mounts over this hole. The BNG can be fixed to the board using solder, glue, screws, or pins. It is also possible to mount the gate to the vacuum chamber wall, and connect the contacts of the BNG to the board using short lengths of wire. The board includes heat sinks, which provide a heat path from the board to the mounting chamber. Possible cooling schemes include: water, liquid nitrogen, dry ice, fanned air, air, or Peltier elements. Many other methods could be used to mount the BNG on the board; generally with isolated contact between the two wire sets of the BNG and the outputs of the driver. The shape of the BNG frame can be adapted to fit the board. The hole in the center of the board allows ions to pass through the board. By mounting both the BNG and the BNG driver on the same substrate, such as the BNG driver board, the output pins of the driver and the input pins of the BNG can be connected directly on the board, and no separate transmission line or any other type of connection, such as traces on the board, is needed. This eliminates or reduces the distortion introduced into the voltage waveform actually applied to the BNG. The board is then placed in the vacuum chamber. The driver dimensions fit inside the custom vacuum chamber.

Figure 2A:
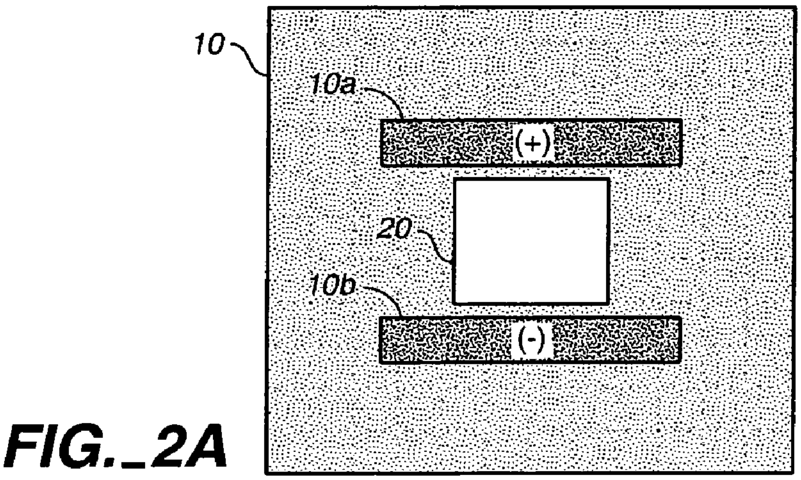
FIG. 2A is a front view of a driver board.
Figure 2B:
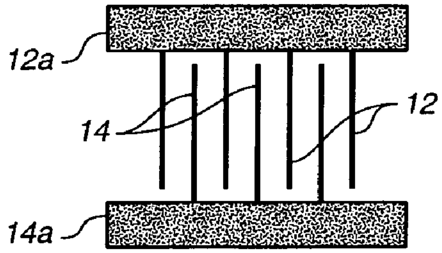
FIG. 2B is a schematic view of a BNG.
Figure 2C:
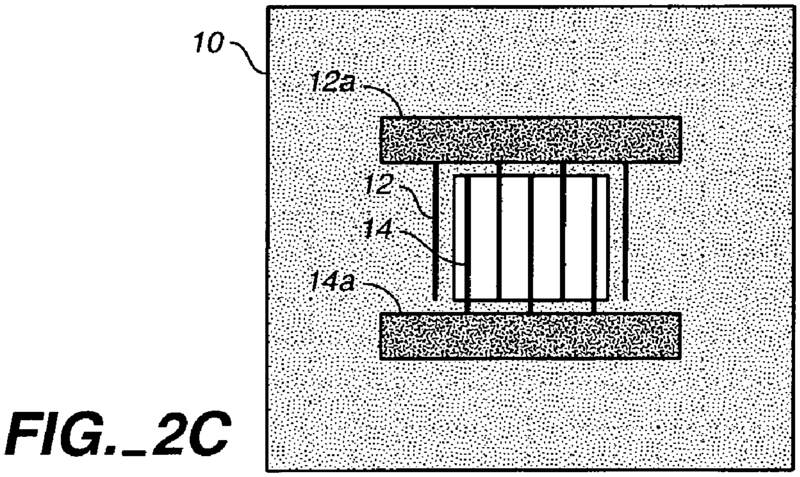
FIG. 2C is a front view of the driver board of FIG. 2A with the BNG of FIG. 2B mounted thereon.
Figure 2D:
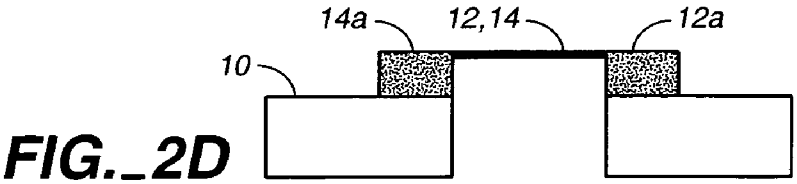
FIG. 2D is a side view of the driver board of FIG. 2A with the BNG of FIG. 2B mounted thereon.

FIG. 2A is a front view of a driver board. FIG. 2B is a schematic view of a BNG with two isolated wire sets 12 and 14 terminating at conductive plates 12*a*, 14*a*. FIG. 2C is a front view of the driver board of FIG. 2A with the BNG of FIG. 2B mounted thereon. FIG. 2D is a side view of the driver board of FIG. 2A with the BNG of FIG. 2B mounted thereon. The driver board 10 is composed of standard or high-vacuum circuit board. It has arbitrary shape and dimensions, such that it will fit within the vacuum chamber. The board 10 is mounted perpendicular to the flight path of the beam. It has a center hole 20 through which the ion beam is transmitted, such as along paths 16 and 18 of FIG. 1B. The sequence is generated inside or outside of the vacuum chamber and delivered to the driver board. At the driver board, circuits (not shown) inside the board amplify the sequences with positive and negative amplitudes to the deflection voltages. These amplified sequences are delivered to two contact points 10*a* and 10*b* on the board [(+) and (−)].

The BNG is mounted directly to the face of driver board. There are many strategies for holding it in place, including: solder, screws, or pins. The BNG has dimensions such that the center aperture of the driver board is covered by the wire sets of the BNG. The BNG is mounted in a position such that each wire set is in electrical contact with one of the contact points 10*a*, 10*b*. Contact can be made by pushing the conductive plates directly against the contact points of the board, or by connecting the conductive plates to the contact points with short jumper wires. In this manner, no transmission line is necessary to connect the driver and the BNG.

In addition to eliminating the transmission lines (coaxial cables) between the BNG driver and BNG, this embodiment is able to operate at modulation speeds up to 50 MHz and deflection voltages up to 30V, and it includes a snubber for impedance matching between the driver and the BNG. The H-Bridge Driver is constructed from two DEIC420 high speed, high power MOSFET drivers. The snubber connects across the BNG to limit signal overshoot and ringing. It includes two sets of 150 ohm high power thin film non-inductive resistors in series with 22 pF capacitors.

Figure 3A:
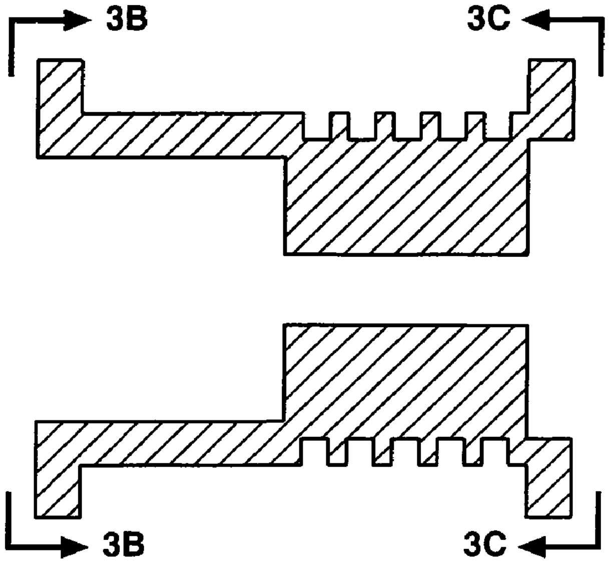
FIG. 3A is a cross-sectional view of a vacuum chamber that may be used for housing the BNG board supporting both the BNG and the BNG driver, to illustrate one embodiment of the invention.
Figure 3B:
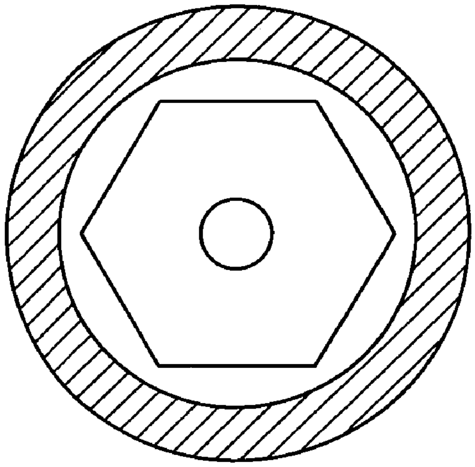
FIG. 3B is a view of the vacuum chamber of FIG. 3A along the line 3B-3B in FIG. 3A.
Figure 3C:
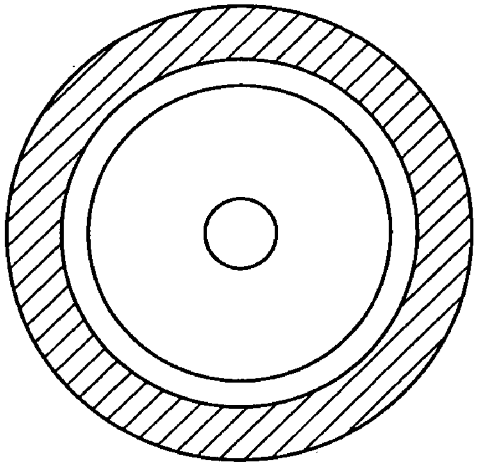
FIG. 3C is a view of the vacuum chamber of FIG. 3A along the line 3C-3C in FIG. 3A.
Figure 3D:
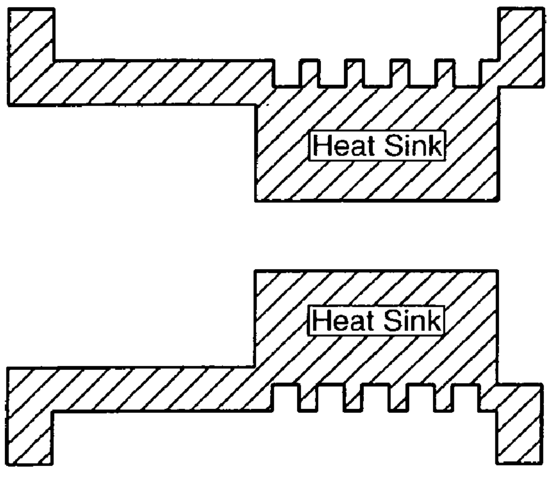
FIG. 3D is a view of the vacuum chamber of FIG. 3A, with heat sink incorporated in the chamber wall.
Figure 3E:
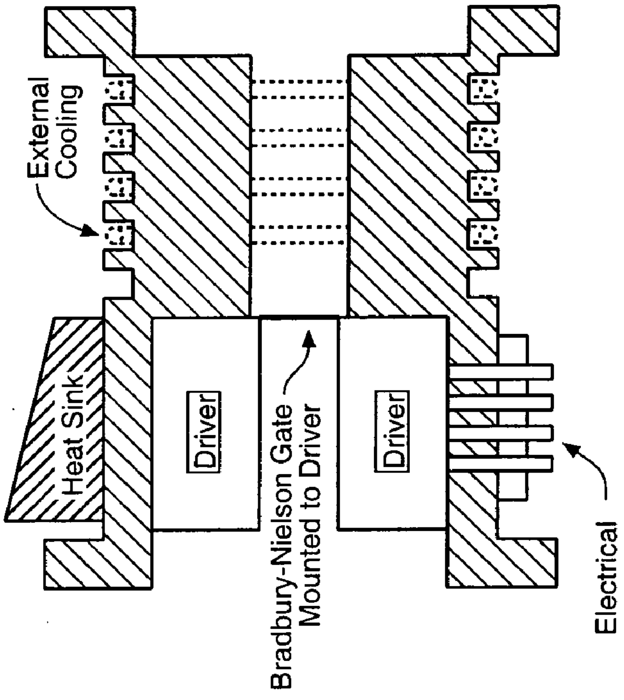
FIG. 3E is a cross-sectional view of the vacuum chamber of FIG. 3A, with all components installed.

This board mounts inside a custom vacuum chamber or housing that was designed to fit standard vacuum hardware dimensions and to dissipate any heat generated by the driver electronics. Schematics of this chamber are displayed in FIGS. 3A-3E. FIG. 3A is a cross sectional view of a vacuum chamber that may be used for housing the BNG board supporting both the BNG and the BNG driver, to illustrate one embodiment of the invention. FIG. 3B is a view of the vacuum chamber of FIG. 3A along the line 3B-3B in FIG. 3A. FIG. 3C is a view of the vacuum chamber of FIG. 3A along the line 3C-3C in FIG. 3A. FIG. 3D is a view of the vacuum chamber of FIG. 3A, with heat sink incorporated in the chamber or housing wall. FIG. 3E is a cross sectional view of the vacuum chamber of FIG. 3A, with all components (driver and BNG mounted on driver board with electrical connections, and heat sink) installed. FIG. 3A shows the cross-section of the vacuum chamber or housing, where the chamber in which BNG driver board is located is shown as hexagonal in shape (FIG. 3B), and the flight tube is circular in cross-section (FIG. 3C). The matching dimensions of the three pieces in FIGS. 3A-3C are illustrated in dotted lines. FIG. 3E shows how the BNG driver board is mounted to the BNG driver.

In order to dissipate heat generated by the electronics the vacuum chamber is constructed from aluminum (or any material with a high thermal conductivity), has large aluminum blocks on its interior to act as heat sinks, and has a rippled exterior. The rippled exterior maximizes surface area and efficiently mounts cooling lines.

Figure 4:
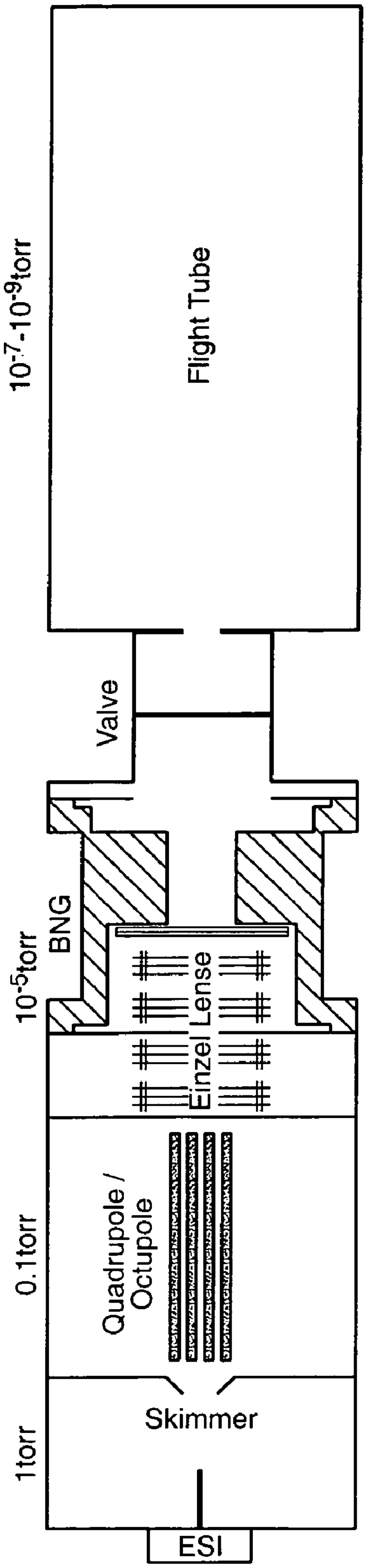
FIG. 4 is a schematic diagram showing how the vacuum chamber or housing fits into a generic HT-TOFMS instrument, where the BNG driver is omitted to simplify the figure.

FIG. 4 shows how the chamber fits into a generic HT-TOFMS instrument, where the BNG driver is omitted to simplify the figure. The chamber may be constructed with aluminum, but the chamber could be constructed from any metal, hard metal or alloy with high thermal conductivity and desirable vacuum performance ($<10^{-5}$ torr). The hexagonal cross section of the section of the chamber for housing the BNG driver matches the shape of the boards and provides flat surfaces on which heat sinks, cooling fans, the sequence generator, and/or electrical feedthroughs can be mounted. The inner diameter of the portion of the chamber behind the BNG has been minimized in order to maximize the size of the aluminum frame, which acts as a heat sink. This portion of the chamber also has a rippled exterior; this feature increases surface area and provides an ideal surface for mounting water-cooling. Degassing from the circuit board is not a problem because the board is mounted in an intermediate pressure region ($10^{-5}$ torr), not in the flight chamber ($10^{-8}$ torr).

Because the electrical feedthroughs are mounted on the aluminum chamber, the entire chamber/driver/BNG unit can removed from the mass spectrometer without disassembling any other portions of the instrument and with minimal disconnection of electrical wiring. Once removed, the BNG and other parts of the driver unit can be inspected, repaired, or replaced without removing the board from the chamber.

This BNG and the electronics generating the gating sequence have been built as one piece and installed under vacuum. This design will: (1) minimize electrical skewing of the modulation sequence (2) minimize echo intensities and increase real peak intensities in HT-TOFMS spectra (3) increase achievable ion beam modulation frequencies in any gating application (4) increase mass resolution in any TOFMS or IMS applications using BNGs (5) simplify the installation and repair of BNGs and the associated electronics and (6) increase the ease of adapting existing TOFMS equipment to HT-TOFMS.

One way of constructing the Bradbury-Nielson gate (BNG) is described in U.S. Pat. No. 6,664,545, entitled "Gate for Modulating Beam of Charged Particles and Method for Making Same," which patent is incorporated by reference herein in its entirety. This method is also described in Kimmel, J. R.; Engelke, F.; Zare, R. N. Rev.Sci.Instrumen. 2001, 72, 4354-57, which is incorporated by reference herein in its entirety.

In order to improve the signal-to-noise ratio and to achieve more accurate results, we have also investigated the operation of the BNG for use in HT-TOFMS as well as for other applications, as described below.

It was found that the magnitude of the modulation defects and the intensity of the echoes grew as the applied modulation voltage was increased. In an attempt to reduce the operation voltage of the instrument, BNGs with finer wire spacing, and hence stronger effective fields, were produced and installed. The most promising spectra were obtained using a BNG with a wire spacing of 100 micron at deflection voltages between 10 and 15 V. Within our instrument, where ions must be deflected off the axis of the flight path by at least 0.07 degrees in order to miss the detector, these spectra had a signal-to-noise ratio more than 2 times greater than that achieved with more widely spaced BNGs at deflection voltages up to 50 V. Echo intensities in the spectra obtained with this 100 microns BNG were among the lowest observed. This technique is applicable to the conventional HT-TOFMS set-up as well as the novel one described herein, and to applications other than HT-TOFMS A TBA+ spectrum obtained with the 100 microns BNG operating at a deflection voltage of 25 V was used to demonstrate how, with an exact knowledge of the modulation errors, software post-processing can further reduce echo intensity. The processing eliminated the spectral echoes in the bins immediately adjacent to the TBA+ peak, narrowing the width of the TBA+ peak by 30% and resolving isotopes that were present.

Experimental

Reagents

The sample for all HT-TOFMS experiments was a 200 mM solution of tetrabutylammonium acetate (TBA, Sigma Chemical, St. Louis, Mo.), Mw=301.5 g mol-1, in a 50:50 v/v mixture of high purity water (18 MW cm−1) and methyl alcohol (Aldrich Chemical, Milwaukee, Wis.) with 0.001 M acetic acid (Aldrich) added. Sample solutions were sonicated and filtered with 0.45 mm Puradisc AS disposable cartridges (Whatman, Maidstone, UK) before analysis.

Electrospray Ionization (ESI) HT-TOFMS

The basic configuration of the ESI HT-TOFMS, including the pseudorandom sequencer generator, the ion optics scheme, the data acquisition system, and the electrospray ionization source have been described previously4. The TBA+ solution was continuously infused through a 30 cm long, 100 micron i.d.×360 micron o.d. fused-silica capillary (Polymicro Technologies, Tucson, Ariz.). One end of the capillary was converted to a gold-coated sheathless electrospray emitter following the procedure described by Bamidge et al. 17,18. Solutions were nebulized by applying 35 hPa (0.5 psi) to a sealed sample vial connected to the ESI emitter, which was held at 2.5 kV. The emitter tip was mounted in a xyz micro-positioning stage opposite the grounded interface of the mass spectrometer (125° C., 2.7 Torr). A 40 mm diameter multichannel plate (MCP) detects the ions. The detector is preceded by a 6-mm masking slit that blocks ions deflected by the BNG. The flight distance between the BNG and this mask is approximately 2 m. The MCP signal was preamplified (VT120C, EG&G Ortec, Oak Ridge, Tenn.) and fed to the discriminator input of a multichannel scaler (Turbo-MCS, EG&G Ortec) furnished with a 50-MHz clock output for synchronization of the detection and encoding circuits.

The encoding sequence, which is generated by an 11-bit shift registry and applied to the BNG in the form of binary and periodic square voltage pulses, repeats after 2047 100-ns elements have been applied to the wires. When measuring mass spectra, the multichannel scaler summed counts in 2047 bins, with a dwell time of 100 ns. Data were collected on a PC using Turbo MCS software (EG&G Ortec). Each set of 2047 elements constitutes one scan; 200,000 successive scans were summed to increase spectral intensity. Using software written in C++, data sets were deconvoluted with the inverse Hadamard transform to recover the TOF spectrum.

When optimizing the instrument and when measuring ion deflection efficiency of the BNGs, ion counts were summed in 100-ms bins. The voltages of the ion optics were adjusted to maximize total ion counts each time a new BNG was installed. To ensure that the beam was centered on the gate, three beam profiles were recorded according to our previously described procedure. See Kimmel, J. R.; Engelke, F.; Zare, R. N. Rev.Sci.Instrumen. 2001, 72, 4354-57. At the start of each run, ESI emitter position was adjusted for intensity and signal stability.

Bradbury-Nielson Gates

Bradbury-Nielson gates with wire spacing of 100, 150, and 300 micron were produced using a weaving method we developed. See Kimmel, J. R.; Engelke, F.; Zare, R. N. Rev.Sci.Instrumen. 2001, 72, 4354-57. Wire spacing was controlled using a mechanically etched polymer wire guide (Ultem 1000, General Electric Plastics, Pittsfield, Mass.). 20 micron gold-plated tungsten wire (California Fine Wire, Grover Beach, Calif.) was used for all BNGs. With the exception of the space between grooves on the wire guide, the four BNGs were identical in design. The central circular active area of each BNG, through which the ions pass, had a diameter of 15 mm. The maximum diameter of the beam entering the gate was estimated to be 5 mm.

Determination of Deflection Efficiency

Figure 1D:
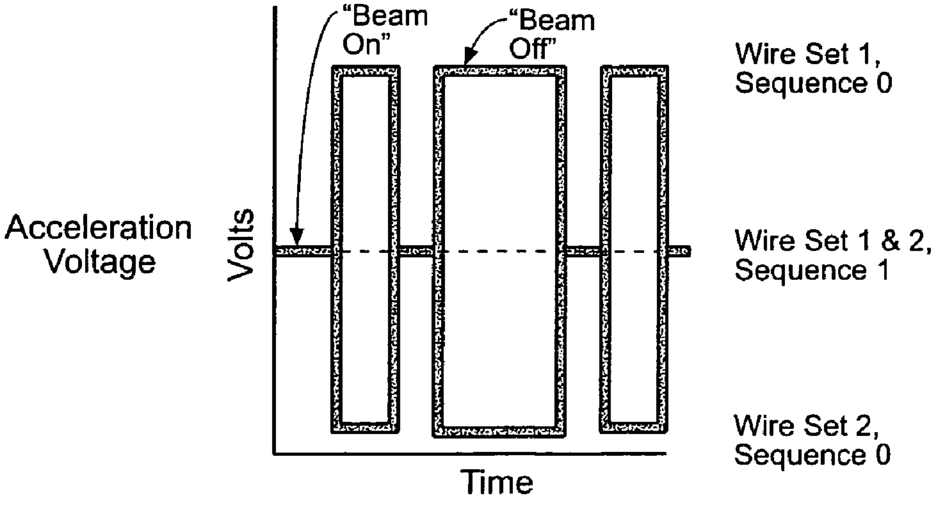
FIG. 1D is a graphical plot of a trace of a voltage pulse that is applied to the wire sets of the Bradbury-Nielson gate in a HT-TOFMS, useful for illustrating the invention.

FIG. 1D is a graphical plot of a trace of a voltage pulse at one wire set of the Bradbury-Nielson gate in a HT-TOFMS using a conventional configuration. While infusing the water:

methanol:acetic acid mixture, the total intensity of the ion beam was measured by counting ions with all BNG wires held at −1250 V, and the acceleration voltage applied to the instrument's liner; see FIG. 1D (beam on mode). If, in addition to the liner voltage, a constant DC voltage is applied to each set of wires so that they differ from the instrument's liner voltage by an equal magnitude and opposite sign, the gate's deflection efficiency can be measured. The magnitude of the difference between the positive wire set and the liner voltage is termed the deflection voltage. Provided that the deflection voltage is large enough, all ions will be deflected from their initial flight trajectory and will miss the detector. Hence, this mode, in which the voltage of wire set 1 is positive and the voltage of wire set 2 is negative relative to the acceleration voltage of the ions, is called the beam off mode. The threshold voltage necessary to deflect 100% of the ion beam depends on the dimensions of the mass spectrometer and the BNG wire spacing. At voltages below the threshold a fraction of the ion beam will pass undeflected. A deflection efficiency curve is obtained by scanning this DC bias voltage between 0 and 50 V and monitoring the ion counts with 100-ms wide acquisition bins. These curves were fit to a sigmoid function that was used to extract the defect parameters related to incomplete deflection.

Encoding Sequence Pulse Traces

Figure 5:
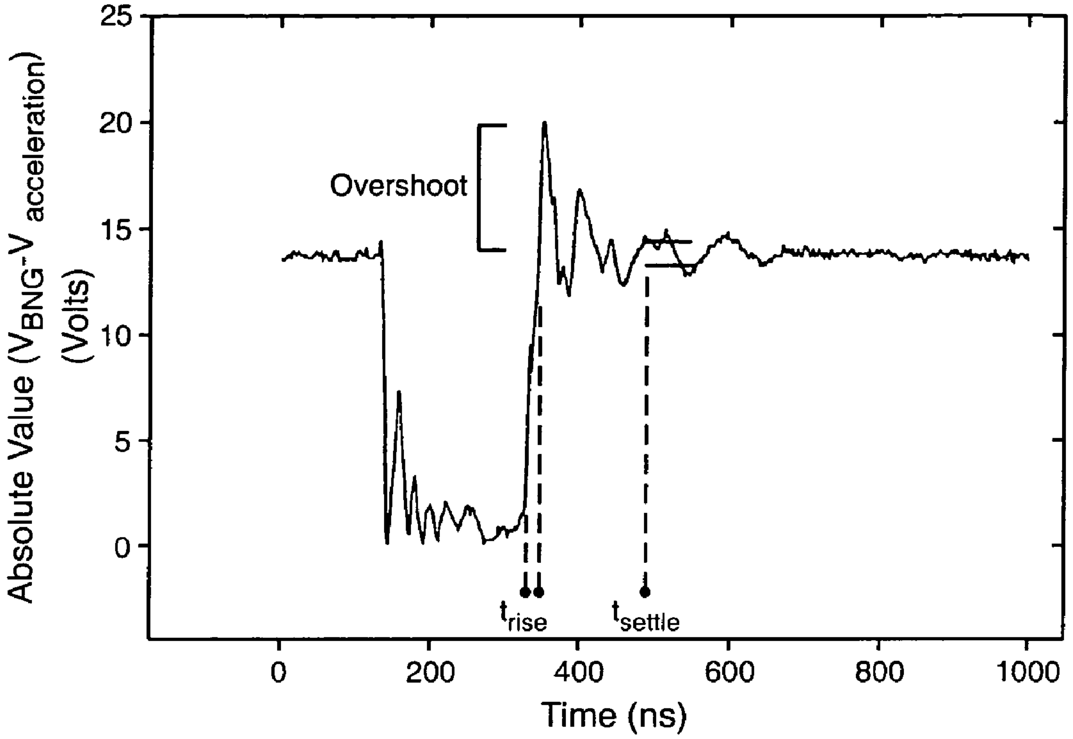
FIG. 5 is a graphical plot of a trace of a voltage pulse at one wire set of the Bradbury-Nielson gate in a HT-TOFMS using a conventional configuration. The 15 V pulse is distorted by finite rise time, overshoot, and ringing.

Traces of the square encoding pulses were obtained by probing one of the wire sets using a 500 MHz digital storage oscilloscope (Waverunner LT 342, LeCroy, Chestnut Ridge, N.Y.). Data were graphically analyzed to determine the rise times (defined as time necessary to reach 90% of intended voltage), percent overshoot, and settling time (defined as time necessary to settle within 5% of intended voltage). FIG. 5 shows a typical trace. BNGs were impedance matched to the RF driver using an RC snubber placed on the inner walls of the vacuum chamber housing the ion gate Brock, A.; Rodriguez, N.; Zare, R. N. Rev.Sci.Instrumen. 2000, 71 , 1306-18.

Optimization of the snubber component values minimized ringing in the sequence, but the ringing could not be completely eliminated. We attribute the residual ringing to power dissipation deficiencies and uncontrolled impedances in our current driver design.

Impulse Response Modeling

Complete descriptions of the matrices used for encoding the ion beam and of the inverse Hadamard transform used to deconvolute the raw data are found in the work by Harwit et al. 12,19 and Wilhelmi et al. 20 Crucial to HT-TOFMS, and all other HT techniques, is consistency between the matrices used in the encoding and decoding steps. A data set x is encoded with an nxn simplex matrix, Sn, yielding a convoluted data set z. Sn−1, the inverse of the encoding matrix Sn, is then applied to z in order to recover the data set x. Any discrepancies between the applied encoding scheme and the intended matrix Sn may reduce signal intensities and increase the noise in the mass spectrum. Such discrepancies can arise if either the device delivering the sequence to the system produces errors that skew the sequence or if the effect of a sequence element on the system differs from that which is intended/assumed. The encoding errors that this study focuses on include any experimental factors that distort the elements of the applied Sn matrix in a scan-to-scan invariant manner. In such instances, the deconvoluted spectra contain discrete errors whose intensities, positions, and signs reflect the nature of the encoding defect.

Using the encoding sequence pulse traces described in the previous section, models of the applied pulses were developed in order to simulate the effects of specific modulation defects on HT-TOFMS spectra. The modeling process involves several steps: (1) generation of an impulse vector13 matching the peak position of TBA+ in the experimental spectra, (2) generation of Sn, the ideal pseudorandom encoding sequence, (3) calculation of the value of the defective sequence elements at a given modulation voltage (based on the beam deflection profiles), (4) introduction of one or multiple defects in specific portions of the encoding sequence to generate Sn*, the defective encoding sequence, (5) encoding the impulse vector with Sn*, and (6) decoding the convoluted data using the inverse of Sn*. These operations were performed on a 700 MHz Pentium III-based PC, with 384 MB RAM.

The impulse response vector consisted of a 2047 elements. Element 793 had an arbitrary intensity of 1000 and all other elements had intensities equal to 0. This vector mimics the HT-TOF mass spectrum of TBA+ obtained in low-resolution mode5. No isotopic peaks were added to the simulated spectrum.

Figure 7:
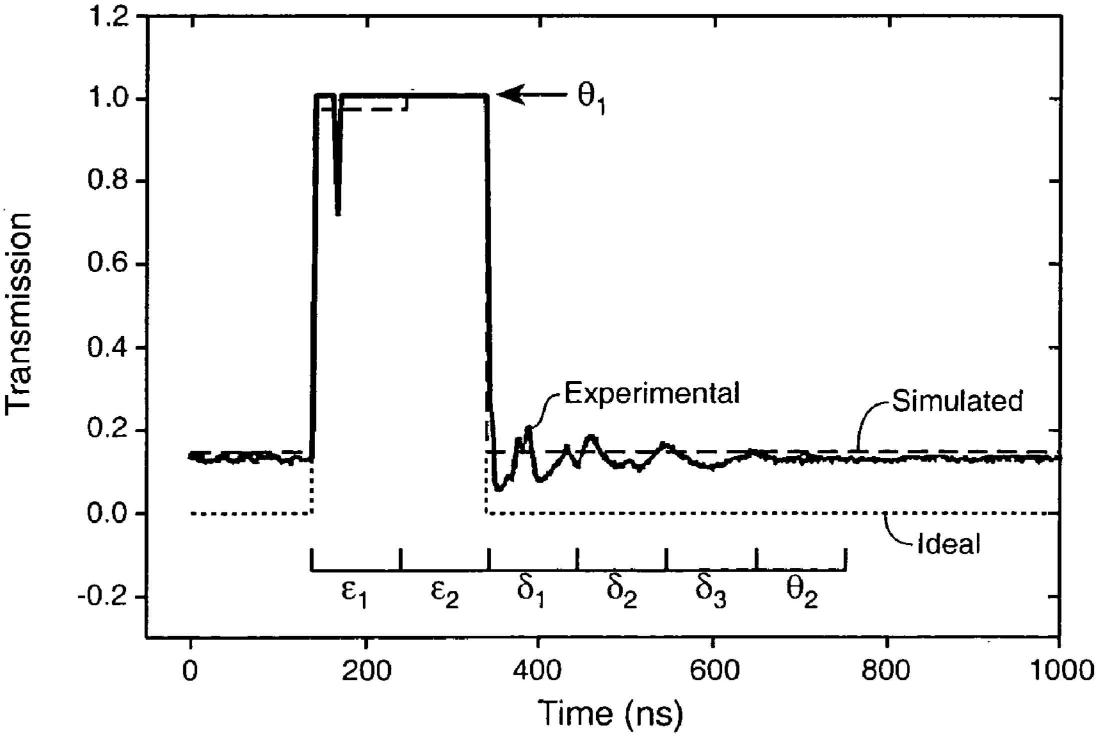
FIG. 7 is a graphical plot of ideal, experimental, and simulated transmission profiles for a 100-μm BNG operated at 15 V. Only the first two defective e elements are shown in the plot owing to the duration of the pulse (200 ns).
Figure 6A:
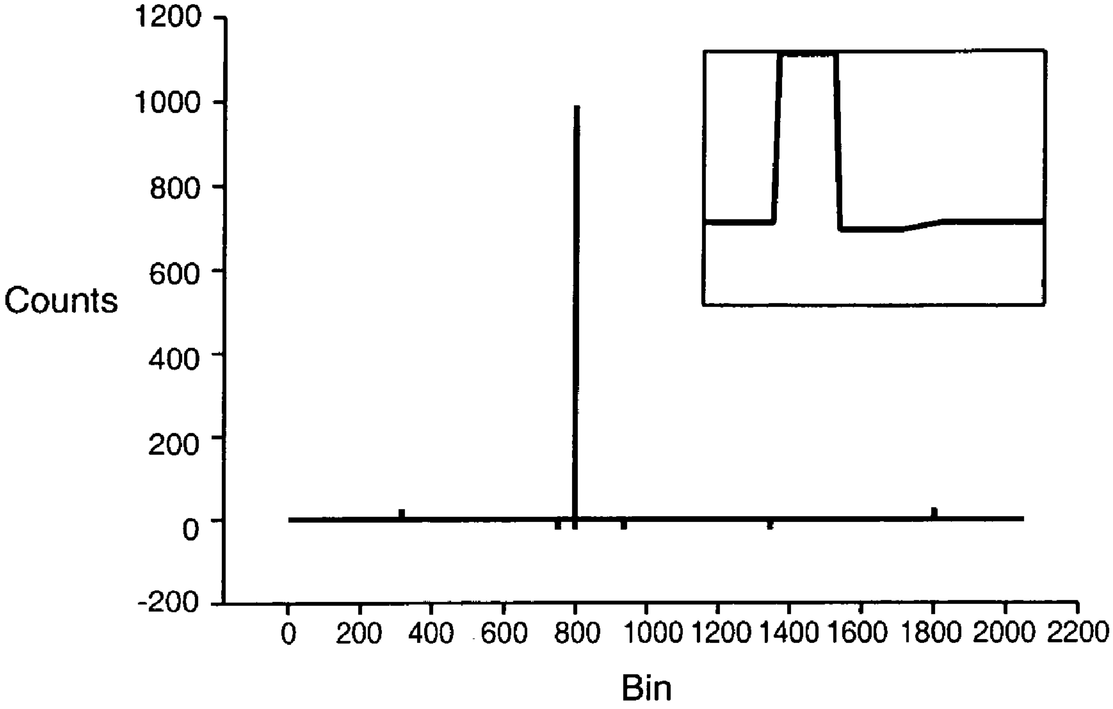
FIGS. 6A-6D are graphical plots of Simulated HT-TOFMS spectra of $TBA^+$ (tetrabutyl ammonium) peak (bin 793) limiting modulation errors to only a single type. The real intensity of the peak is 1000 in each case. Reductions of the intensity of bin 793 and the appearance of other peaks are due to electronic modulation errors.
Figure 6B:
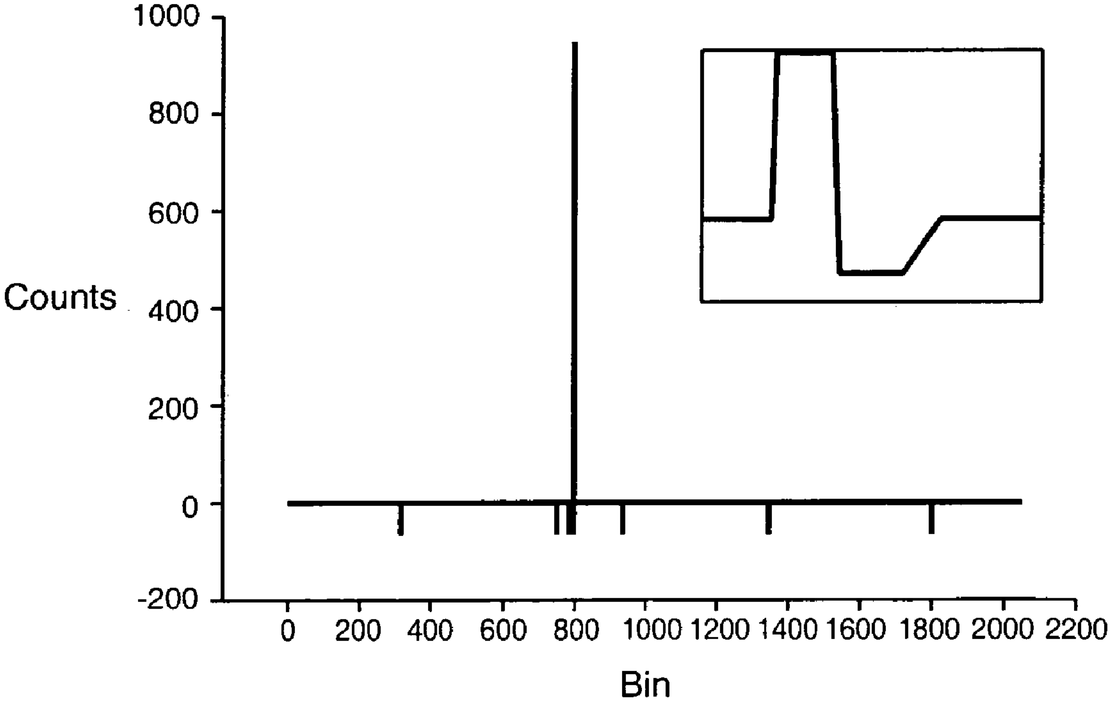
Figure 6C:
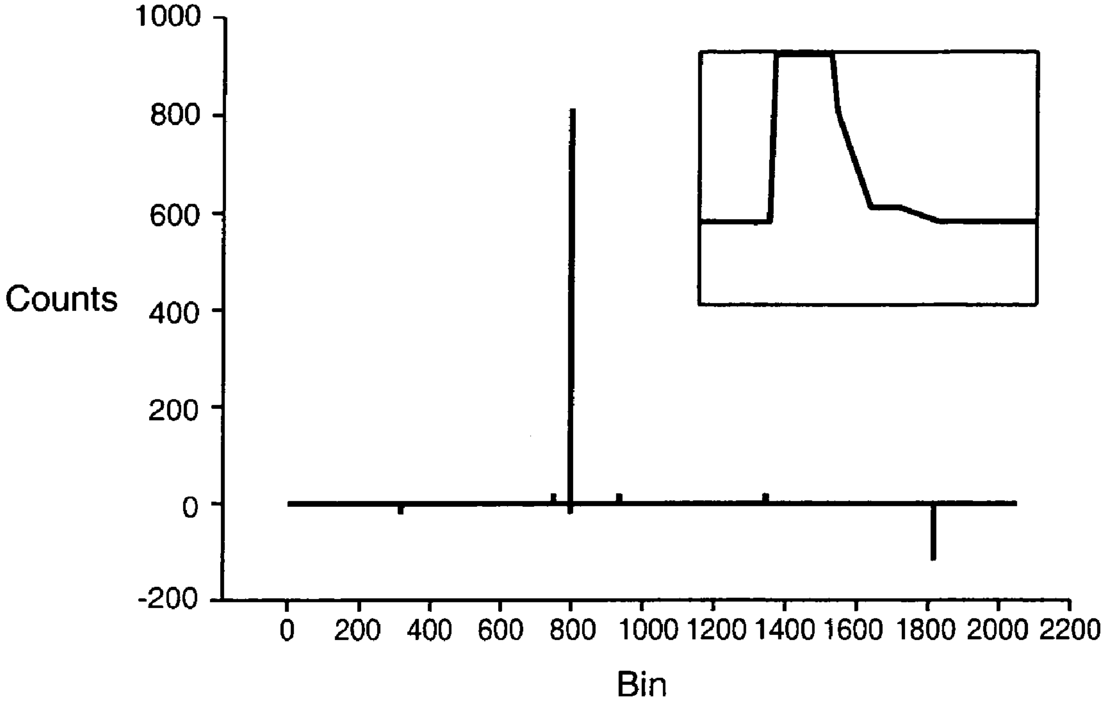
Figure 6D:
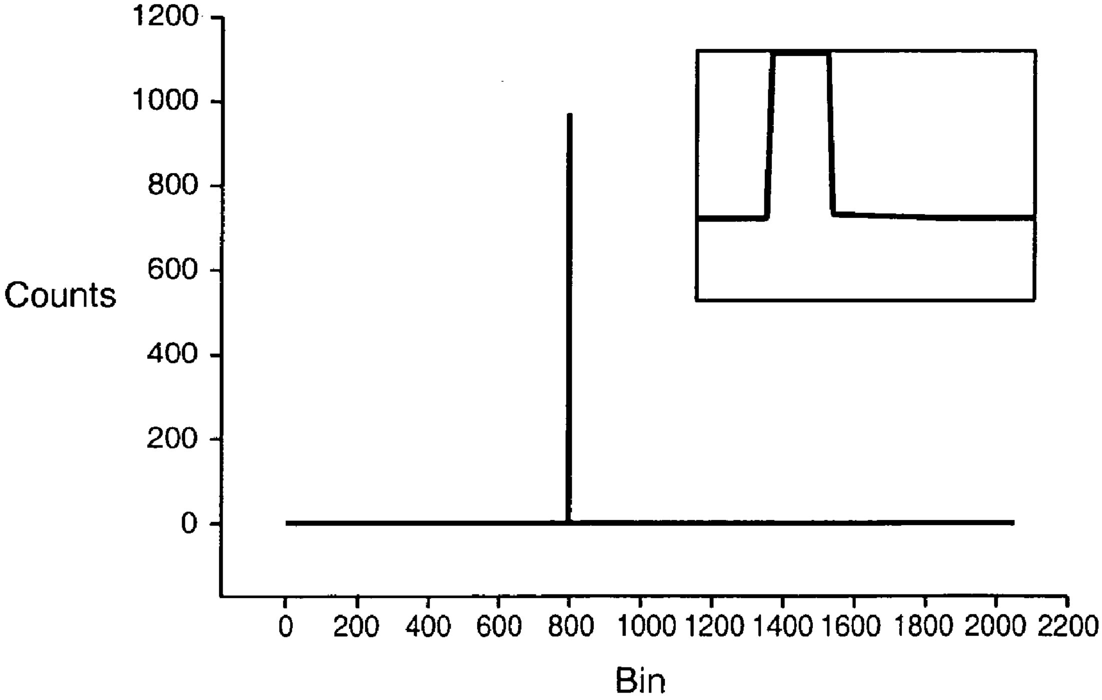

The ideal pseudorandom sequence was coded using a series of nested loops that resemble the chained shift registers used in the HT-TOFMS electronics. The result is a vector comprised of 1's and 0's. Using simple logical relations, the indices of the following type of sequence elements were found: e1, e2, e3: first, second and third elements after a transmission rising edge (0 to 1); d1, d2, d3: first, second and third elements after a transmission falling edge (1 to 0); q1: all remaining elements that should be equal to 1; q2: all remaining elements that should be equal to 0. FIG. 7 includes definitions of this nomenclature.

In an ideal case, all d and q2 are 0 while e and q1 are 1. Overshoot and ringing in the applied RF sequence cause the applied voltages to deviate in ways that decrease the transmission of e-type elements and increase the transmission of d-type elements. Simultaneously, application of deflection voltages with magnitudes that are less than the deflection threshold yields transmission in the beam off mode, altering the value of all d and q2 type elements.

Within one modulation bin (100 ns) the applied voltage might oscillate several times around the specified value. This ringing-overshoot effect was modeled by fitting the experimentally measured pulse shape to a damped-sine function with variable amplitude depending on the deflection voltage. The generated voltages versus time curves were converted to transmission versus time curves using the experimentally obtained voltage-deflection relationship. The transmission in an acquisition time bin was calculated as the mean value of the transmission in a 100 ns interval. These transmission values were then used in the construction of skewed modulation sequences consisting of values between 0 and 1.

In some instances, a difference between the magnitude of the applied RF sequence pulses and DC bias voltages continued to induce unwanted deflection in the beam on mode even after the ringing had dampened. This difference in voltage, which was caused by inaccuracies in our home-built power supplies, was used to adjust the value of q1-type elements. The value of q2-type elements was simply the transmission efficiency at the applied deflection voltage value.

The skewed sequences were used to generate the simplex matrix by shifting each successive row by one element to obtain S2047*. The S2047-1 matrix used for deconvolution was computed by inverting the S2047 matrix derived from the ideal 2047-element pseudorandom sequence.

Spectral Correction Methods

Spectral correction methods were demonstrated using an experimental HT-TOF mass spectrum of TBA+. The inverses of the skewed matrices described in the previous section, $(S_{2047}^{*})^{-1}$, were calculated and used to deconvolute the experimental data. To efficiently improve the TBA+ peak shape the defect parameters used in the correction method were chosen by setting a search grid 0.15 transmission units wide around each of the modeled defect values. The best correction parameters were chosen by visual inspection of the deconvoluted spectrum.

Results

Ideal, Experimental, and Modeled Pulses

Similar to when poorly cut mechanical slits are used to apply encoding sequences in HT optical spectroscopy, skewing of voltage pulses caused by scan-to-scan invariant effects produces echoes in HT-TOF mass spectra. In the encoding scheme described, we expect four potentially detrimental effects: slow rise times, voltage overshoot on the edges followed by ringing, mismatched baselines between the two wire sets, and incomplete deflection in the beam off mode.

Using the methods described earlier, voltage-time traces, such as that displayed in FIG. 5, were used to develop transmission-time traces. FIG. 7 shows transmission versus time for experimental and ideal 15 V pulses using a 100 micron BNG together with the simulated transmission vector integrated over the discrete time bins.

The downward transmission spike following the rising voltage edge in FIG. 7 reflects overshoot as the wire sets move from the deflection voltage to the liner voltage. In voltage versus time plots the relative magnitude of this overshoot was ~55% (see Table 1 below) and varied little between deflection voltages and BNG wire spacing. The magnitude of this spike in the transmission plot depends on the deflection efficiency of the BNG in the voltage range characteristic of the voltage overshoot. Beyond the edge, the transmission value remains slightly below its maximum for another 40-50 ns. This unintentional deflection reflects ringing in the RF voltage that causes the wire sets to oscillate around the liner voltage. In order for overshoot or ringing of this sort to disturb the intended trajectory of the ion beam, the ion gate must demonstrate significant deflection at voltages near the settling value. As the magnitude of the ringing decreases, the transmission approaches a constant, maximum value. Differences between the final value of the wires and the liner voltage of the instrument may prevent this maximum from equaling 1. The transmission remains at this stabilized value until the next sequence 0.

TABLE 1

| Deflection Voltage (V) | Rise Time (ns) | Overshoot | Settling Time (ns) |
|---|---|---|---|
| 5 | 6 | 63% | 85 |
| 15 | 5 | 61% | 84 |
| 25 | 5 | 55% | 84 |
| 40 | 6 | 48% | 84 |

Table 1 shows experimentally determined modulation pulse characteristics for a 100 microns BNG operating at 10 MHz. Rise times were recorded when the pulses reached 90% of the desired modulation voltage. Percent overshoot was calculated by comparing the maximum to the set value. Settling time was defined as the time necessary for the voltage to dampen within 5% of the set value.

All that is necessary to deflect the beam completely, as a sequence 0 implies, is the application of a voltage with magnitude greater than the deflection threshold. Thus, overshoot on the transition from 1 to 0 cannot harm the applied sequence. In fact, if the magnitude of the intended voltage is below the deflection threshold, overshoot in this direction will momentarily improve performance. In FIG. 4, the transmission falls rapidly towards 0% as the voltage overshoots the intended value. The voltage then recovers, rings sinusoidally, and finally settles at the applied deflection voltage. In FIG. 7, the 15 V that are applied are not sufficient to induce complete deflection. As a result, the transmission oscillates around and settles at a value near 0.15. Rise and fall times were measured to be on the order of 5 ns for all wire spacing and modulation voltages. While slow transitions could significantly alter the sequence, 5 ns seemed to be negligible in these experiments using 100 ns modulation elements.

The simulated pulses compensate for each of these effects by adjusting the values of the 100 ns elements equal to the mean value of the real data during the same time span. The simulated pulse displayed in FIG. 7 takes into consideration all of the factors discussed above. Sequence elements past the points where the ringing has settled were modeled using the parameters $q_1$ and $a_2$ for the beam on and beam off modes, respectively (1.000 and 0.146 in the example shown in FIG. 7). For the 15 V trace displayed in FIG. 4, the values of the edge defect parameters were $e_1$=0.968 and $e_2$=1.000 for the 0 to 1 transition, and $d_1$=0.157, $d_2$=0.146, and $d_3$=0.140 for the 1 to 0 transition. In order to investigate how masking defects vary with experimental parameters, similar plots were derived from voltage versus time data for deflection voltages between 0 and 40 V. As described later, the skewed S matrices, $S_{2047}^{*}$, built from these results were used to simulate HT-TOF mass spectra of TBA+ and to correct the experimental spectra.

Impulse Response Method Calculations

As a first step toward understanding the manifestation of modulation errors in the HT-TOF mass spectra, each type of electronic sequence skewing was simulated using the impulse-response method. Four separate skewed S matrices, $S_{2047}^{*}$, with each of the defect parameters artificially accentuated, were applied to the impulse response vector and deconvoluted with the inverse of the ideal matrix, $(S_{2047})^{-1}$ to determine specific effects on spectra. FIGS. 6A-6D illustrate simulated HT-TOFMS spectra of TBA+ limiting modulation errors to only a single type in each case: (a) $\theta_1$, $\epsilon_1$, $e_2$, and $e_3$ equal to 0.9 in FIG. 6A; (b) $\theta_2$, $\delta_1$, $d_2$, and $d_3$ equal to 0.3 in FIG. 6B; (c) $\epsilon_1$ equal to 0.9 in FIG. 6C; and (d) $\delta_1$ equal to 0.3 in FIG. 6D. Conceptually, these conditions mimic (a) differences between the wire voltages and the instrument's liner voltage in the beam on mode (b) voltages below the deflection threshold in the beam off mode (c) rise times, overshoot, and/or ringing on the rising edge of a transmission pulse, and (d) rise time and/or ringing on the falling edge of a transmission pulse. The baseline near the simulated TBA+ peaks in FIGS. 6A-6D has been magnified to investigate changes in spectral resolution. With the exception of case (d), all spectra contain obvious echoes. While the echoes are easily identifiable in this simple spectrum of a known compound, interpretation can become complicated when spectra contain multiple unknown peaks, each producing their own echoes. Most notable and destructive, are the echoes in the bins on each side of the real peak, which effectively lessen the resolution of spectrum. These echoes are most prominent in the spectra suffering from errors on the 0 to 1 transition edge (case c). Another intense echo group is that centered in bin 1812, which appears in cases a, b, and c. All echoes resulting from operating at a deflection voltage below the deflection threshold (case b) have negative intensity. Also noteworthy in FIG. 5 is the decrease in signal that accompanies the appearance of echoes. The simulated peak has an arbitrary intensity of 1000 units. In cases (b) and (c), where the echoes have their greatest intensity, peaks heights have reduced to 930 and 810, respectively.

Modeling Real Spectra Using Measured Defect Parameters

Figure 8A:
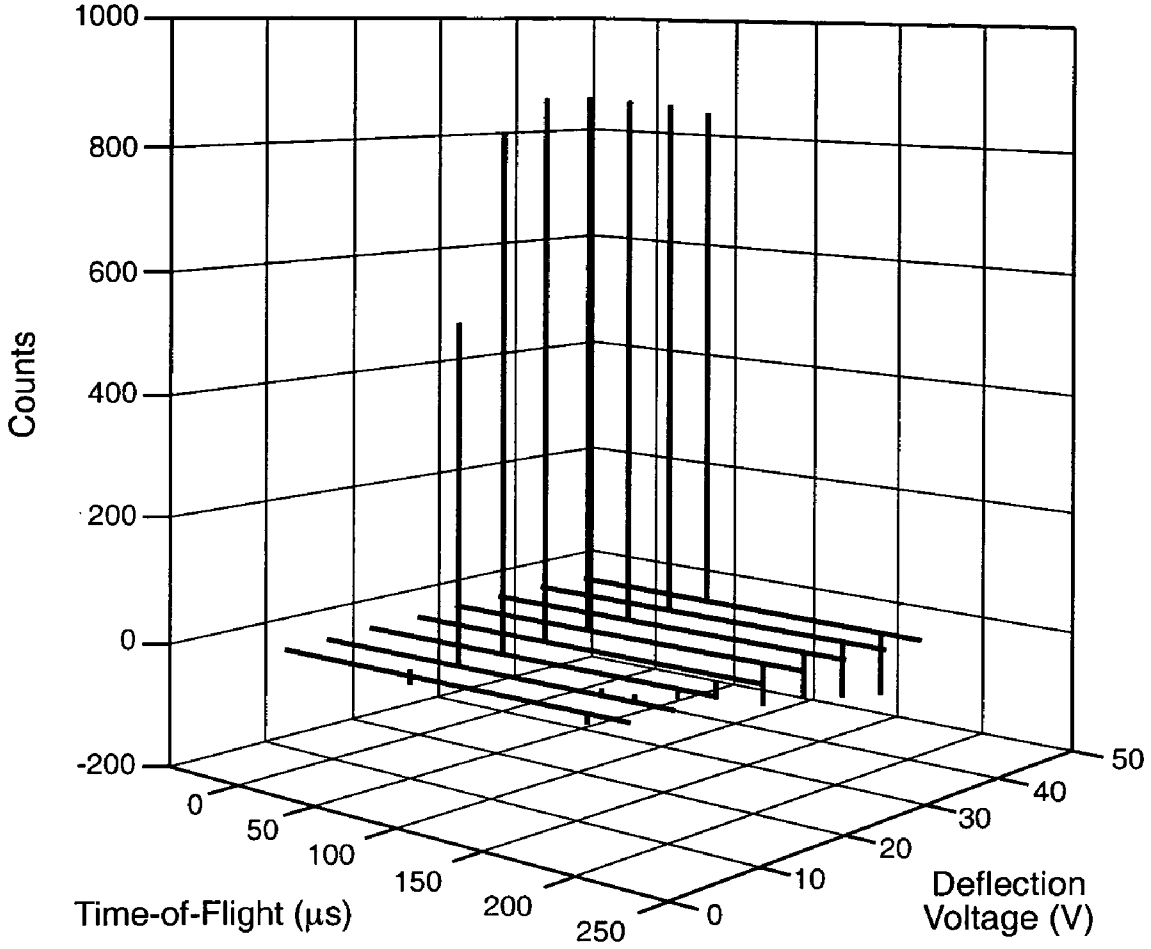
FIGS. 8A and 8B are graphical plots of respectively simulated and experimental HT-TOFMS spectra of TBA+ between deflection voltages of 5 and 40 volts using a 100 microns BNG.
Figure 8B:
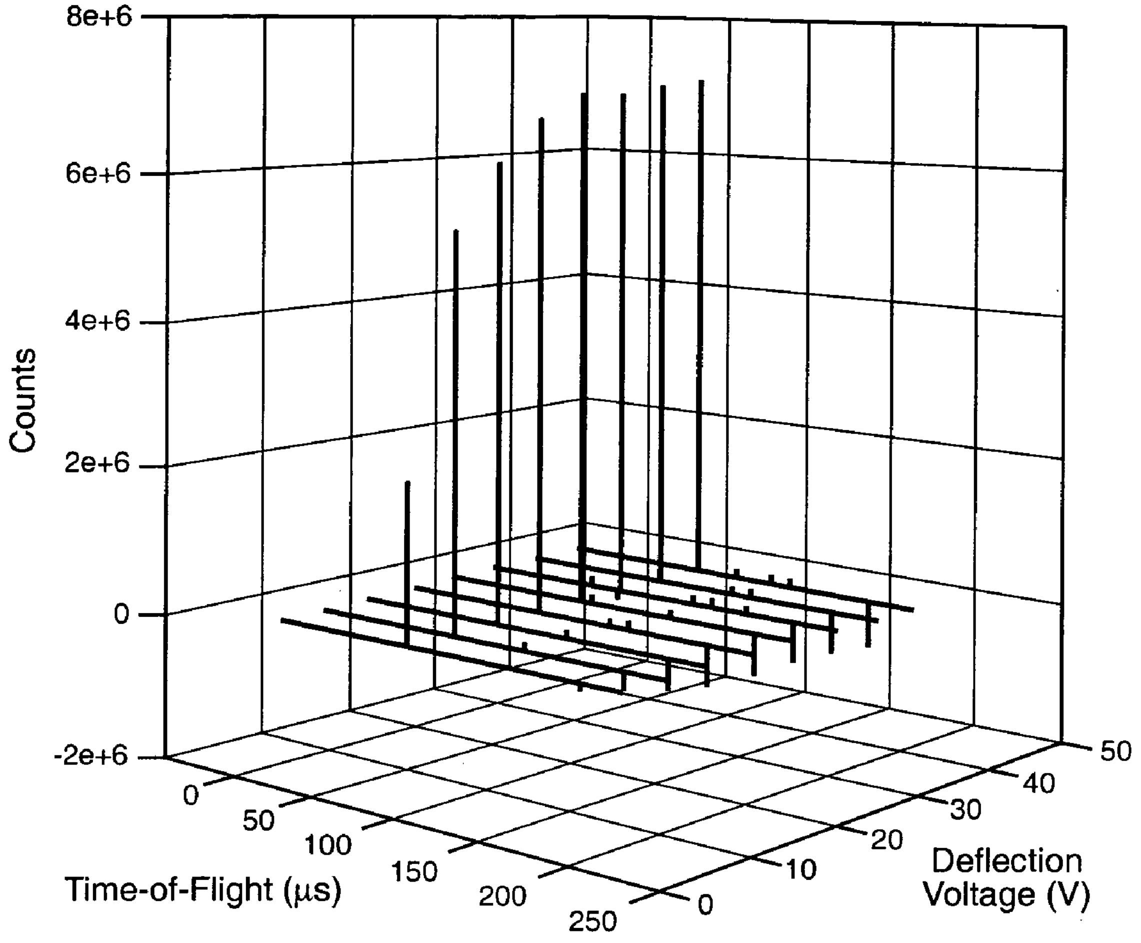

Matrices derived from the pulse traces were used to predict HT-TOFMS spectra at voltages between 5 and 40 V using a 100 microns BNG (FIG. 8A). There are several trends apparent in these spectra that correlate well with the experimental data (FIG. 8B). Signal intensity increases toward a maximum as voltage in increased, while echo intensity is minimal below 15 V. These observations reflect the fact that, because deflection efficiency is poor below the threshold deflection voltage (25 V in this case), the amplitude of ringing and the magnitude of overshoot are not large enough to significantly distort the modulation sequence in this voltage range. At voltages above the threshold, where deflection can no longer improve, the magnitudes of overshoot, ringing, and mismatching are large enough to skew significantly the intended deflection of the beam, and their effects become more pronounced in the spectra. Signal intensities begin to fall off, and echo intensities grow rapidly. These trends suggest that the operational deflection voltage must be lowered to improve performance.

Effect of BNG Wire Spacing on Deflection Efficiency and SNR

Optimizing the modulation voltage turns out to be a balance between skewing effects; the effects of ringing and overshooting are minimized as the modulation voltage is lowered, but low voltages (below the deflection threshold) lead to decreased signal intensities. Hence, for best results, the instrument must operate at the deflection threshold. In an effort to reduce the voltage of the deflection threshold to a point where the impact of overshoot and ringing is insignificant, BNGs with finer wire spacing, and consequently stronger effective field strengths, were made and installed.

HT-TOF mass spectra of TBA+ were acquired using BNGs with wire spacings of 300, 150, and 100 micron at deflection voltages between 0 and 50 V. The TBA+ peak intensity, the intensity of the echo peak in bin 1812 relative to the TBA+ peak intensity, and the signal-to-noise ratio (SNR) were recorded for each of these spectra. These results are plotted in FIGS. 9A-9C.

Figure 9A:
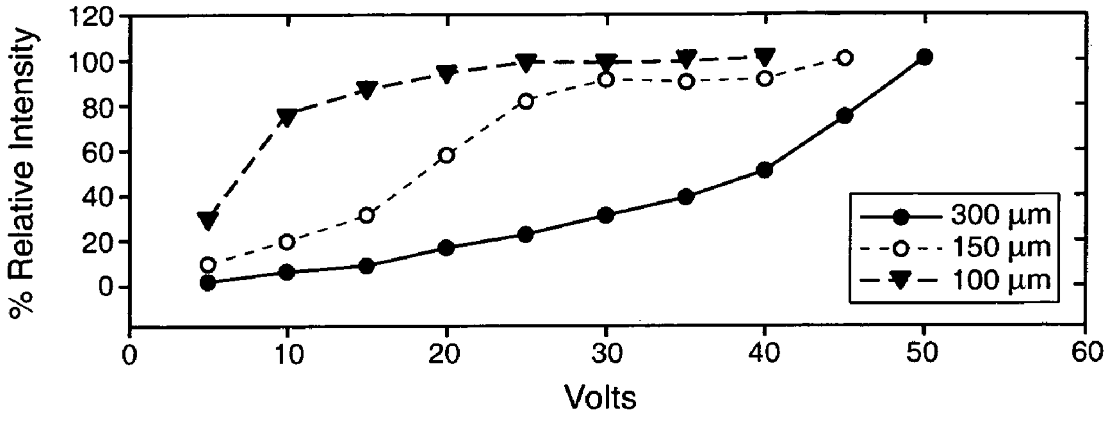
FIGS. 9A-9C are graphical plots of respectively intensity of TBA+ peak in HT-TOFMS spectra; intensity of echo in bin 1812; and signal-to-noise ratio in TBA+ spectra, calculated as the TBA+ peak intensity divided by the intensity of the random noise (3s of echo-free region of baseline).

FIG. 9A compares the relative peak intensities acquired with the three BNGs, each normalized to their own maximum. In each case, we see peak intensity growing as voltage is increased, reflecting an improvement in deflection efficiency. The 300 microns BNG continues to improve across the entire voltage range, suggesting that it never reaches 100% deflection of the beam. The 150 microns BNG rises quickly at 20 V, and levels off between 30 and 45 volts. As expected, the 100 microns BNG displayed the most promising results. It rises quickly, reaching 75% of its maximum intensity at 10 V and reaching its maximum intensity after 20 V.

Figure 9B:
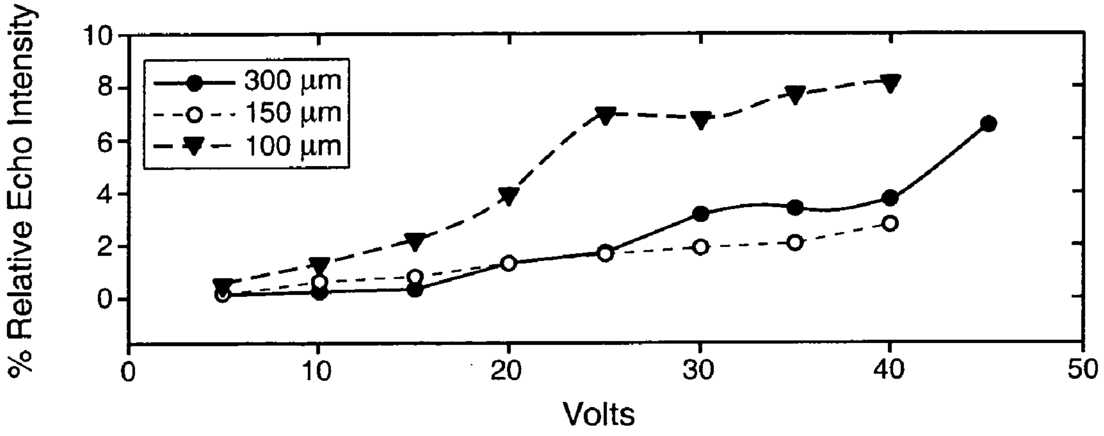

FIG. 9B plots the relative intensity of the echo peak in bin 1812 compared to the TBA+ peak. At low voltages the three BNGs display similar values. Near 15 V, the intensity of the echoes observed when using the 100 micron BNG begins to rise rapidly. This fact demonstrates the strong control the 100 microns BNG has on the trajectory of the beam. The magnitude of the ringing, overshoot, and mismatching is no greater with this BNG than with any others, but these small fluctuations in the applied voltage significantly distort the profile of modulated beam. Thus, an increase voltage gives a larger signal, as shown in FIG. 9A, but also gives a larger echo, as shown in FIG. 9B. Beyond a certain voltage, the echo peak grows faster than the signal for a given BNG spacing.

Figure 9C:
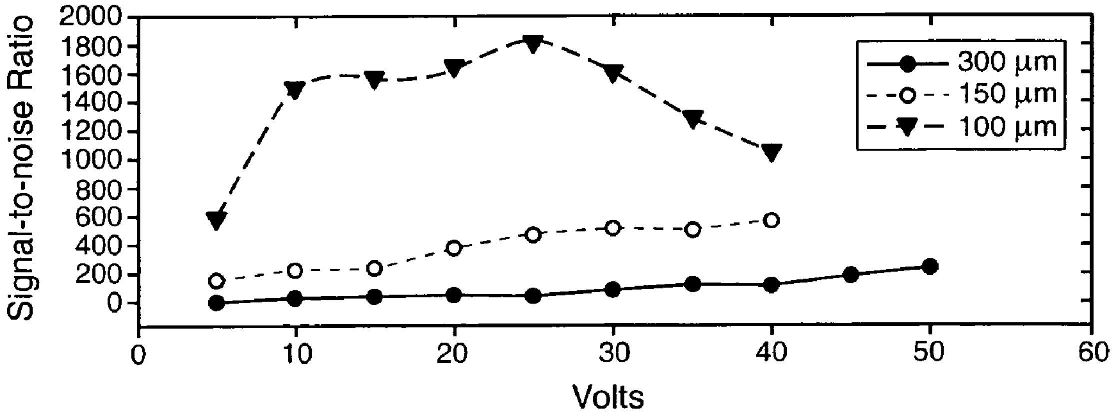

FIG. 9C compares the intensity of the TBA+ peak to regions of the spectrum containing only random noise. Modulating a TBA+ sample at 15 V, the 100 microns BNG demonstrated a SNR of nearly 1500 with echo intensities that are ~2% of the TBA+ peak intensity. This SNR value is more than two times that of any observed with the more widely spaced gates over the entire 50 V range. While the decreased wire spacing reduces ion transmission (83% for a 100 microns BNG versus 94% for a 300 microns BNG), the large increase in SNR suggests that the sacrifice is worthwhile. Beyond 30 V the SNR begins to fall, indicating that mismodulation of the beam at the BNG is becoming significant.

Spectral Correction Methods

Figure 10A:
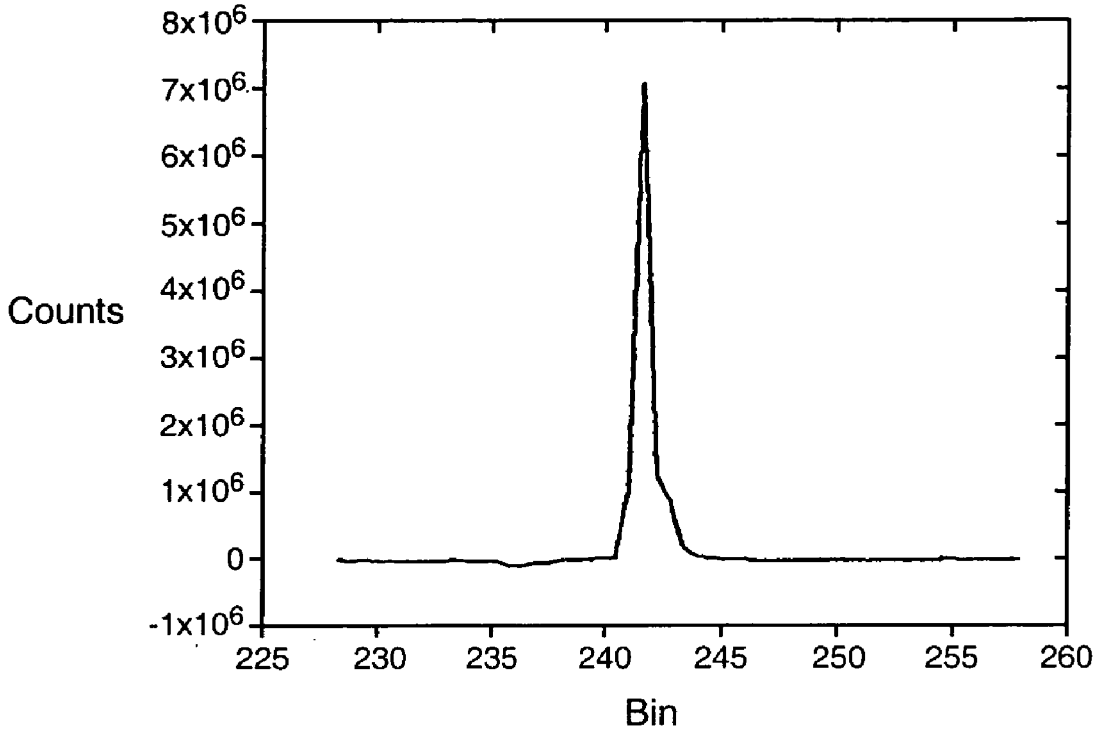
FIGS. 10A and 10B are graphical plots of signal recovery from a TBA+ spectrum obtained with a 25 V modulation voltage and a 100 microns grid.
Figure 10B:
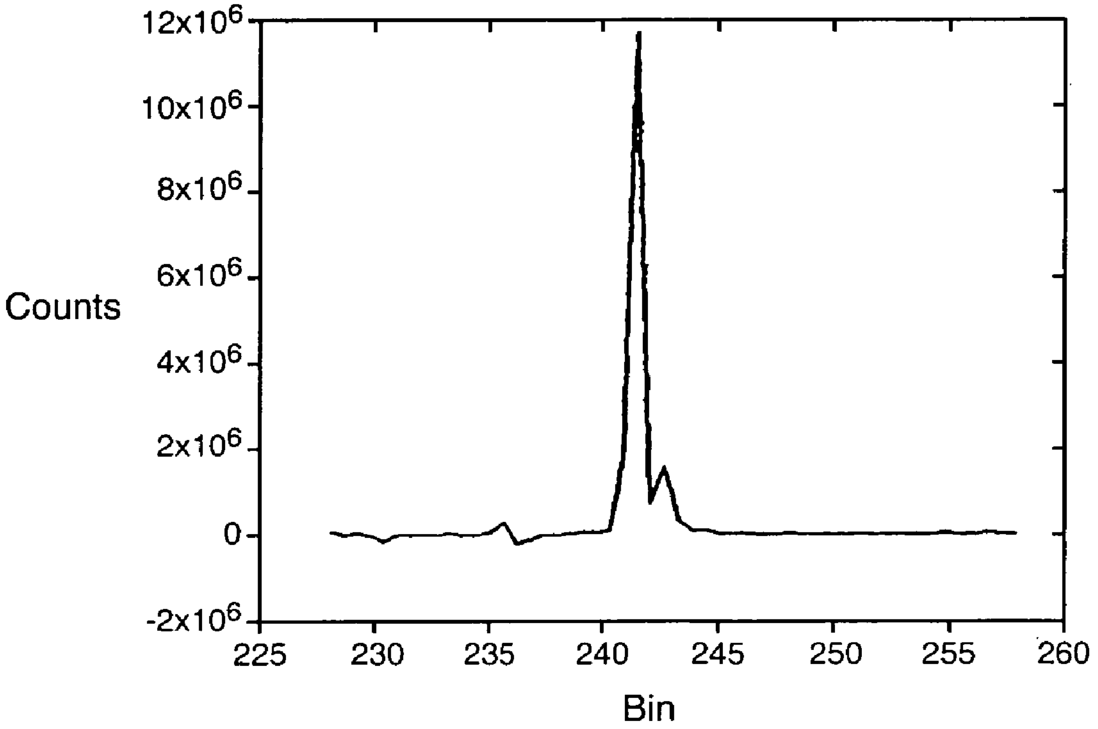

A separate, but complementary, approach to reducing echoes caused by distortion that remains invariant, scan to scan, involves post-processing of the acquired data. FIG. 10A shows the TBA+ peak shape when the experimental data are deconvoluted using S−1. If instead of the ideal S−1 matrix, the defective (S*)−1 matrix is used in the deconvolution process, echo intensities decrease and peak shapes are improved. In FIG. 10B, post processing has reduced the TBA+ peak width by ~30%, resolving TBA+ isotope peaks.

This correction approach would be completely satisfactory if the masking errors were fixed over time. However, our experience with the present modulation electronics suggests that the errors vary too much, run to run, for this approach to be practical. For this reason, efforts are presently being made to re-engineer BNG driver electronics in order to reduce significantly overshoot and ringing. All spectra shown in this study were acquired using modulation bin widths of 100 ns, which limits the achievable mass resolution. This fact explains why FIGS. 10A and 10B do not display the resolution that might be expected for a 2-m flight path. We anticipate that improved modulation electronics will also allow us to reduce this bin width and consequently increase the mass resolution.

While the invention has been described above by reference to various embodiments, it will be understood that changes and modifications may be made without departing from the scope of the invention, which is to be defined only by the appended claims and their equivalent. All references referred to herein are incorporated by reference.

What is claimed is:

1. A Hadamard transform time-of-flight mass spectrometric method for analyzing a sample, comprising:
   - providing a defect compensated decoding matrix corresponding to an encoding sequence;
   - encoding a stream of charged particles by means of the encoding sequence;
   - detecting the times of arrival of the particles to provide an output signal; and
   - decoding the output signal by means of the matrix.

2. The method of claim 1, wherein said providing comprises:
   - introducing at least one defect in an encoding sequence to generate a defective encoding sequence; and
   - encoding an impulse vector with the defective encoding sequence to form the defect compensated decoding matrix.

3. The method of claim 2, wherein said providing further comprises:

obtaining a beam deflection profile of the sample using a Hadamard transform time-of-flight mass spectrometer; and calculating values of elements of a defective sequence based on the beam defection profile, wherein the calculated values are used to introduce at least one defect in the encoding sequence.

4. The method of claim 2, wherein said impulse vector matches substantially peak positions in an experimental spectra of the sample.

5. The method of claim 4, wherein said providing further comprises generating the encoding sequence as a pseudorandom encoding sequence.

* * * * *